(12) United States Patent
Huber et al.

(10) Patent No.: US 6,564,220 B1
(45) Date of Patent: May 13, 2003

(54) SYSTEM AND METHOD FOR MONITORING SUPPORT ACTIVITY

(75) Inventors: Gary D. Huber, Austin, TX (US); Ganapathi S. Lakshminarayanan, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/465,569

(22) Filed: Dec. 17, 1999

Related U.S. Application Data

(63) Continuation-in-part of application No. 09/413,523, filed on Oct. 6, 1999.

(51) Int. Cl.$^7$ .............................................. G06F 17/30
(52) U.S. Cl. ................................... 707/100; 707/204
(58) Field of Search ................................ 707/100, 204, 707/101, 104, 102; 714/46, 37, 40, 7, 38, 49, 20, 22, 25

(56) References Cited

U.S. PATENT DOCUMENTS

| | | | |
|---|---|---|---|
| 4,253,178 A | 2/1981 | Kolaczia | 368/285 |
| 4,356,545 A | 10/1982 | West | 364/200 |
| 4,438,458 A | 3/1984 | Munscher | 358/254 |
| 4,491,914 A | 1/1985 | Sujaku | 364/200 |
| 4,627,060 A | 12/1986 | Huang et al. | 371/62 |
| 4,635,187 A | 1/1987 | Baron et al. | 364/200 |
| 4,788,658 A | 11/1988 | Hanebuth | 364/900 |
| 4,809,280 A | 2/1989 | Shonaka | 371/62 |
| 4,916,699 A | 4/1990 | Ohashi | 364/900 |
| 4,964,077 A | 10/1990 | Eisen et al. | 364/900 |
| 5,010,551 A | 4/1991 | Goldsmith et al. | 371/16.4 |
| 5,017,030 A | 5/1991 | Crews | 400/485 |
| 5,060,135 A | 10/1991 | Levine et al. | 364/200 |
| 5,196,993 A | 3/1993 | Herron et al. | 361/393 |
| 5,214,695 A | 5/1993 | Arnold et al. | 380/4 |
| 5,224,024 A | 6/1993 | Tu et al. | 364/429 |
| 5,228,655 A | 7/1993 | Garcia et al. | 248/118 |
| 5,276,805 A | 1/1994 | Hamaguchi | 395/164 |
| 5,287,448 A | 2/1994 | Nicol et al. | 395/159 |
| 5,287,505 A | 2/1994 | Calvert et al. | 395/600 |

(List continued on next page.)

FOREIGN PATENT DOCUMENTS

| | | | |
|---|---|---|---|
| GB | 2065939 | 7/1981 | G06F/11/30 |
| GB | WO 98/18086 | 4/1998 | G06F/17/30 |
| GB | 2329266 | 3/1999 | G06F/11/00 |
| GB | 2356271 | 5/2001 | G06F/11/00 |
| WO | WO 93/00628 | 1/1993 | G06F/1/24 |
| WO | WO 94/08289 | 4/1994 | G06F/9/445 |
| WO | WO 97/09676 | 3/1997 | |

OTHER PUBLICATIONS

Great Britain Search and Examination Report 0019866.3, Mar. 12, 2001.
@Backup Company, "@Backup Company Information Page" at Internet, http://security.atbackup.com/VID101.3.819255.0/Company.htm, Printed Jun. 15, 1999.
@Backup Company, "@Backup Company Frequently Asked Questions" at Internet, http://security.atbackup.com/VID101.3.819255.0/FAQ.asp, Printed Jun. 15, 1999.

(List continued on next page.)

*Primary Examiner*—Sanjiv Shah
(74) *Attorney, Agent, or Firm*—Baker Botts L.L.P.

(57) ABSTRACT

A computer system for measuring and monitoring local client support activity associated with servicing and supporting a computer by a client is disclosed. The system includes a local client support activity file in the local computer. The local client support activity file preferably records local client support activity. The local client support activity file is further operable to be uploaded when the client contacts a networked support center using the local computer. The system may also be used to evaluate the effectiveness of local support utilities and support center utilities.

19 Claims, 2 Drawing Sheets

U.S. PATENT DOCUMENTS

| | | | |
|---|---|---|---|
| 5,325,521 A | 6/1994 | Koyama et al. | 375/575 |
| 5,346,410 A | 9/1994 | Moore, Jr. | 439/607 |
| 5,348,408 A | 9/1994 | Gelardi et al. | 400/715 |
| 5,353,240 A | 10/1994 | Mallory et al. | 364/552 |
| 5,355,357 A | 10/1994 | Yamamori et al. | 369/75.2 |
| 5,356,099 A | 10/1994 | Sereboff | 248/118.1 |
| 5,367,667 A | 11/1994 | Wahlquist et al. | 395/575 |
| 5,374,018 A | 12/1994 | Daneshvar | 248/118 |
| 5,375,800 A | 12/1994 | Wilcox et al. | 248/118 |
| 5,381,526 A | 1/1995 | Ellson | 395/164 |
| 5,388,032 A | 2/1995 | Gill et al. | 364/146 |
| 5,390,324 A | 2/1995 | Burckhartt et al. | 395/575 |
| 5,392,095 A | 2/1995 | Siegel | 355/200 |
| 5,398,333 A | 3/1995 | Schieve et al. | 395/575 |
| 5,410,447 A | 4/1995 | Miyagawa et al. | 361/681 |
| 5,422,751 A | 6/1995 | Lewis et al. | 359/83 |
| 5,423,605 A | 6/1995 | Liu | 312/265.6 |
| 5,432,927 A | 7/1995 | Grote et al. | 395/575 |
| 5,443,237 A | 8/1995 | Stadtmauer | 248/441.1 |
| 5,450,576 A | 9/1995 | Kennedy | 395/650 |
| 5,454,080 A | 9/1995 | Fasig et al. | 395/283 |
| 5,455,933 A | 10/1995 | Schieve et al. | 395/183.03 |
| 5,471,674 A | 11/1995 | Stewart et al. | 395/650 |
| 5,483,437 A | 1/1996 | Tang | 363/146 |
| 5,503,484 A | 4/1996 | Louis | 400/489 |
| 5,513,319 A | 4/1996 | Finch et al. | 395/185.08 |
| 5,522,572 A | 6/1996 | Copeland et al. | 248/118 |
| 5,526,180 A | 6/1996 | Rausnitz | 359/609 |
| 5,530,847 A | 6/1996 | Schieve et al. | 395/183.14 |
| 5,537,585 A | 7/1996 | Blickenstaff et al. | 395/600 |
| 5,537,618 A | 7/1996 | Boulton et al. | 395/161 |
| 5,547,154 A | 8/1996 | Kirchoff et al. | 248/118.3 |
| 5,547,272 A | 8/1996 | Paterson et al. | 312/223.2 |
| 5,564,054 A | 10/1996 | Bramnick et al. | 395/700 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,627,964 A | 5/1997 | Reynolds et al. | 395/183.22 |
| 5,649,200 A | 7/1997 | Leblang et al. | 717/122 |
| 5,668,992 A | 9/1997 | Hammer et al. | 395/651 |
| 5,678,002 A | 10/1997 | Fawcett et al. | 395/183.01 |
| 5,680,640 A | 10/1997 | Ofek et al. | 395/839 |
| 5,689,253 A | 11/1997 | Hargreaves et al. | 341/22 |
| 5,689,706 A | 11/1997 | Rao et al. | 395/617 |
| 5,694,293 A | 12/1997 | Seto et al. | 361/687 |
| 5,708,776 A | 1/1998 | Kikinis | 395/185.08 |
| 5,708,812 A | 1/1998 | Van Dyke et al. | 395/712 |
| 5,724,224 A | 3/1998 | Howell et al. | 361/680 |
| 5,727,163 A | 3/1998 | Bezos | 395/227 |
| 5,732,268 A | 3/1998 | Bizzarri | 395/652 |
| 5,748,877 A | 5/1998 | Dollahite et al. | 395/183.12 |
| 5,759,644 A | 6/1998 | Stanley | 428/14 |
| 5,768,370 A | 6/1998 | Maatta et al. | 379/433 |
| 5,775,822 A | 7/1998 | Cheng | 400/489 |
| 5,778,372 A | 7/1998 | Cordell et al. | 707/100 |
| 5,790,796 A | 8/1998 | Sadowsky | 395/200.51 |
| 5,796,579 A | 8/1998 | Nakajima et al. | 361/683 |
| 5,797,281 A | 8/1998 | Fox | 63/12 |
| 5,803,416 A | 9/1998 | Hanson et al. | 248/118 |
| 5,805,882 A | 9/1998 | Cooper et al. | 395/652 |
| 5,809,248 A | 9/1998 | Vidovic | 395/200.49 |
| 5,809,511 A | 9/1998 | Peake | 707/204 |
| 5,818,635 A | 10/1998 | Hohn et al. | 359/612 |
| 5,819,274 A | 10/1998 | Jackson, Jr. | 707/10 |
| 5,825,355 A | 10/1998 | Palmer et al. | 345/336 |
| 5,825,506 A | 10/1998 | Bednar et al. | 358/402 |
| 5,826,839 A | 10/1998 | Chen | 248/118 |
| 5,832,522 A | 11/1998 | Blickenstaff et al. | 707/204 |
| 5,835,344 A | 11/1998 | Alexander | 361/683 |
| 5,845,136 A | 12/1998 | Babcock | 395/750.01 |
| 5,852,545 A | 12/1998 | Pan-Ratzlaff | 361/683 |
| 5,854,828 A | 12/1998 | Kocis et al. | 379/93.31 |
| 5,860,001 A | 1/1999 | Cromer et al. | 395/651 |
| 5,860,002 A | 1/1999 | Huang | 395/652 |
| 5,860,012 A | 1/1999 | Luu | 395/712 |
| 5,861,884 A | 1/1999 | Fujioka | 345/338 |
| 5,881,236 A | 3/1999 | Dickey | 395/200.51 |
| 5,884,073 A | 3/1999 | Dent | 395/652 |
| 5,894,571 A | 4/1999 | O'Connor | 395/652 |
| 5,904,327 A | 5/1999 | Cheng | 248/118.1 |
| 5,905,632 A | 5/1999 | Seto et al. | 361/683 |
| 5,906,506 A | 5/1999 | Chang et al. | 439/500 |
| 5,909,544 A | 6/1999 | Anderson, II et al. | 395/200.38 |
| 5,939,694 A | 8/1999 | Holcomb et al. | 235/381 |
| 5,953,533 A | 9/1999 | Fink et al. | 395/712 |
| 5,955,797 A | 9/1999 | Kim | 307/150 |
| 5,960,189 A | 9/1999 | Stupek, Jr. et al. | 395/500.43 |
| 5,960,204 A | 9/1999 | Yinger et al. | 395/712 |
| 5,960,411 A | 9/1999 | Hartman et al. | 705/26 |
| 5,963,743 A | 10/1999 | Amberg et al. | 395/712 |
| 5,974,546 A | 10/1999 | Anderson | 713/2 |
| 5,978,911 A | 11/1999 | Knox et al. | 713/1 |
| 5,983,369 A | 11/1999 | Bakoglu et al. | 714/46 |
| 5,991,543 A | 11/1999 | Amberg et al. | 395/712 |
| 5,995,757 A | 11/1999 | Amberg et al. | 395/712 |
| 6,006,344 A | 12/1999 | Bell, Jr. | 714/37 |
| 6,012,154 A | 1/2000 | Poisner | 714/55 |
| 6,014,744 A | 1/2000 | McKaughan et al. | 713/2 |
| 6,023,267 A | 2/2000 | Chapuis et al. | 345/327 |
| 6,029,257 A | 2/2000 | Palmer | 714/40 |
| 6,029,258 A | 2/2000 | Ahmad | 714/46 |
| 6,032,157 A | 2/2000 | Tamano et al. | 707/104 |
| 6,034,869 A | 3/2000 | Lin | 361/686 |
| 6,038,597 A | 3/2000 | Van Wyngarden | 709/219 |
| 6,047,261 A | 4/2000 | Siefert | 705/11 |
| 6,048,454 A | 4/2000 | Howell et al. | 361/686 |
| 6,049,342 A | 4/2000 | Nielson et al. | 345/473 |
| 6,050,833 A | 4/2000 | Danzyger et al. | 439/92 |
| 6,056,136 A | 5/2000 | Taber et al. | 215/252 |
| 6,061,788 A | 5/2000 | Reynaud et al. | 713/2 |
| 6,061,810 A | 5/2000 | Potter | 714/23 |
| 6,065,136 A | 5/2000 | Kuwabara | 714/31 |
| 6,104,874 A | 8/2000 | Branson et al. | 395/702 |
| 6,108,697 A | 8/2000 | Raymond et al. | 709/218 |
| 6,112,320 A | 8/2000 | Dien | 714/51 |
| 6,113,050 A | 9/2000 | Rush | 248/346.01 |
| 6,166,729 A | 12/2000 | Acosta et al. | 345/327 |
| 6,167,383 A | 12/2000 | Henson | 705/26 |
| 6,167,532 A | 12/2000 | Wisecup | 714/23 |
| 6,170,065 B1 | 1/2001 | Kobata et al. | 714/7 |
| 6,182,212 B1 | 1/2001 | Atkins et al. | 713/1 |
| 6,182,275 B1 | 1/2001 | Beelitz et al. | 717/1 |
| 6,199,204 B1 | 3/2001 | Donohue | 717/11 |
| 6,202,207 B1 | 3/2001 | Donohue | 717/11 |
| 6,226,412 B1 | 5/2001 | Schwab | 382/232 |
| 6,236,901 B1 | 5/2001 | Goss | 700/95 |
| 6,247,126 B1 | 6/2001 | Beelitz et al. | 713/1 |
| 6,256,620 B1 | 7/2001 | Jawahar et al. | 707/2 |
| 6,263,215 B1 | 7/2001 | Patton et al. | 455/561 |
| 6,272,484 B1 | 8/2001 | Martin et al. | 707/1 |
| 6,279,109 B1 | 8/2001 | Brundridge | 713/2 |
| 6,279,125 B1 | 8/2001 | Klein | 714/38 |
| 6,279,156 B1 | 8/2001 | Amberg et al. | 717/11 |
| 6,298,443 B1 | 10/2001 | Colligan et al. | 713/200 |
| 6,298,457 B1 | 10/2001 | Rachlin et al. | 714/49 |
| 6,331,936 B1 | 12/2001 | Hom et al. | 361/686 |
| 6,356,977 B2 | 3/2002 | Ofek et al. | 711/112 |
| 6,367,035 B1 | 4/2002 | White | 714/40 |
| 6,385,737 B1 | 5/2002 | Benignus et al. | 714/22 |
| 6,393,586 B1 | 5/2002 | Sloan et al. | 714/25 |
| 6,449,735 B1 | 9/2002 | Edwards et al. | 714/25 |

OTHER PUBLICATIONS

@Backup Company, "Frequently Asked Questions: Technical" at Internet, http://security.atbackup.com/VID101.3.819255.0/Tech.asp, Printed Jun. 15, 1999.

@Backup Company, "Are You Protected" at Internet, http://security.atbackup.com/VID101.3.819255.0/Main.asp, Printed Jun. 15, 1999.

CNET.com, "IBM to Get Colorful with New Notebooks" at Internet>http://news.cnet.com/news/0–1003–200–296049.html?tag=st.cn.1fd2.<, printed Oct. 6, 1999.

3Com, "Palm Computer, News and Promotions" at Internet >http://www.palm.com/pr/holidaydebut.html<, printed Oct. 5, 1999.

Exploring Windows NT "ZD Journals" at Internet >http://www.zdjournals.com/9802.ewn9821.html<, printed Oct. 18, 1999.

PCWorld News "Compaq Debuts Home PCs" at Internet >http://www2.pcworld.com.html<, printed Oct. 18, 1999.

"HP builds in Net button," at Internet <http://news.cnet.com/news/0–1003–202–316545.html>, printed Oct. 18, 1999.

"Packard Bell PCs provide state–of–the–art technology and complete user support" at <http://www.gadgetguru.com.html>, printed Oct. 18, 1999.

Compaq Computer Corporation, Press Release, "New PCs Offer Equipment, Colour and Personality; Compaq's Presario Range Opened Up for Customisation" at Internet >http://biz.yahoo.com/prnews/000719/compaq_new.html<, printed Jul. 24, 2000.

Compaq Computer Corporation, "Home and Home Office Computing, My Style" at internet >wysiwyg://3/http://athome.compaq.com/showroom/static/splash.asp<, printed Jul. 18, 2000.

Epson, "Epson Stylus Color 74i It makes a Colorful Case for Being Your iMac Printer" at Internet <http://www.epson.com/printer/inkjet/sty740i.html<, printed Jul. 24, 2000.

Radio Shack, advertisement, p. 2, Aug. 20, 2000.

Pending patent application Ser. No. 09/236,862: Alan E. Beelitz, Richard D. Amberg; "Recoverable Software Installation Process and Apparatus for a Computer System"; Dell USA, L.P., filed Jan. 25, 1999.

Pending patent application 09/245,148: Jeffrey N. Sloan, Tim Sullivan, David S. Springer, "*Method and Apparatus for Diagnosing and Conveying an Identification Code in Post on a Non–Booting Personal Computer*"; Dell USA, L.P., Filed Feb. 4, 1999.

Wilson et al. "Knowledge based interface to manufacturing computer system", ACM pp. 1183–1189 Date 1988.

Gree, "Component based software development: implications for documentation", ACM pp. 159–164 Date 1999.

Hall et al., "A cooperative approach to support software deployment using software dock", ACM ICSE pp. 174–183 Date 1999.

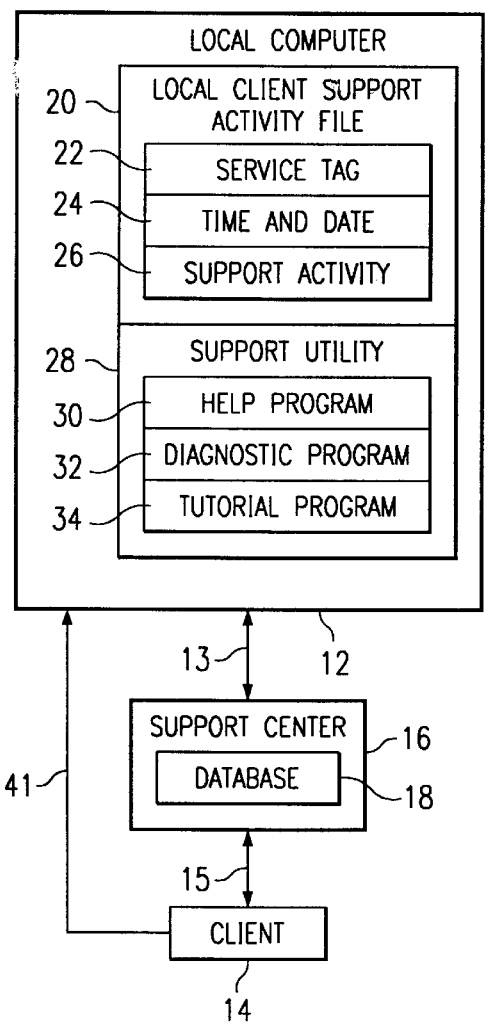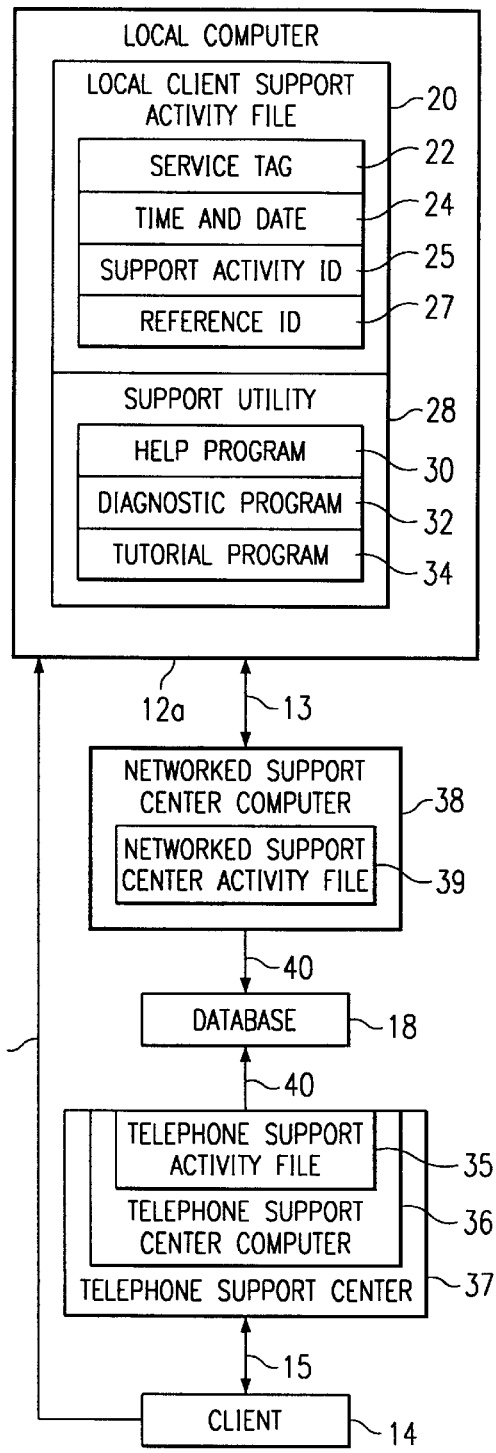

SYSTEM AND METHOD FOR MONITORING SUPPORT ACTIVITY

CONTINUATION-IN-PART APPLICATION

This application is Continuation-in-Part application related to parent application Ser. No. 09/413,523 filed Oct. 6, 1999, entitled SYSTEM AND METHOD FOR MONITORING SUPPORT ACTIVITY.

TECHNICAL FIELD

This invention relates in general to the field of electronic devices. More particularly, this invention relates to a system and method for monitoring support activity.

BACKGROUND

Many computer manufacturers and software makers provide a variety of support services to their clients and customers. These support services often include local support utilities loaded on a client's computer including help programs, tutorial programs, and diagnostic programs to assist clients who use their systems. These support utilities are often designed to be user friendly. When a client experiences a problem or has questions, the client can simply use one of these support utilities to find a solution to a problem or answers to a question. Additionally, computer manufacturers and software makers often provide more direct assistance to clients in the form of support centers. When a client experiences a problem or has questions relating to a computer system, the client may contact a customer support center and communicate with a technical support representative. The technical support representative may then address the client's specific problems or concerns.

Maintaining a support center is often expensive and burdensome. A support center must be staffed with competent technical support representatives who have access to appropriate support utilities. The staff must receive training to maintain competence with changing technology. Managing a support center is often challenging because the number of clients who contact the support center at any given time can be unpredictable. When a support center is understaffed, a client telephoning a support center may be left to wait for assistance for a lengthy period. This often leads to a client frustration and dissatisfaction. Alternatively, when a support center is overstaffed, valuable time and resources are wasted.

One way to reduce the expense of maintaining support operations is to increase the effectiveness of the support utilities maintained on the client's computer. Clearly, a client who finds the answer to a question using one of the support utilities loaded in the client's computer will be less inclined to call or have no need to call a support center to speak with a technical support representative. However, maximizing the effectiveness of support utilities is hampered by the difficulty of measuring how a client or a group of clients make use of the local support utilities loaded on their computers. A technical support representative may ask a client which local support utilities the client used before contacting the support center. However, this method of gathering data related to local client support activity is generally impractical and the data collected may be inaccurate. Additionally, the data collected by this method will likely be limited to the client's present problem and will not delve into past use of local support utilities. Because the client's use of local support utilities takes place independent from the support center, computer and software makers generally have no efficient and reliable way of measuring this support activity.

SUMMARY

Therefore a need has arisen for a method and system to effectively and reliably measure the use of local support utilities.

A further need exists for a method and system for efficiently gathering data related to local client support activity.

A further need exists for an efficient and reliable method to identify the support steps a particular client has taken prior to contacting a support center.

A further need exists for a method and system for evaluating the effectiveness of local support utilities.

In accordance with teachings of the present disclosure, a system and method are described for monitoring support activity. The system includes a local client support activity file which measures the use of local support utilities such as help programs, diagnostic programs, and tutorial programs. When a client uses one of the support utilities, the activity file records the service tag or another identifier of the computer, the date and time of the support utility use, and records what support utility activity transpired. When the client's computer contacts a networked support center computer, the local client support activity file may be uploaded into the networked support center computer and stored in a database. Information collected within the database can then be used to evaluate the effectiveness of the local support utilities.

In one aspect of the present disclosure, a computer system for measuring and monitoring local client support activity associated with servicing and supporting a client using a computer includes a local client support activity file in a local computer. The local client support activity file records local client support activity. Furthermore, the local client support activity file may be uploaded by a support center computer when the client contacts a networked support center using the local computer. More specifically, the local client support activity file records a service tag for identifying the local computer, a record of the date and time of the local support activity, and a record of the local support activity.

In another aspect of the present disclosure, a computer system for measuring and monitoring client service and support activity associated with a local computer includes a local client support activity file maintained at the local computer and a support center activity file maintained at a networked support center. The support center also includes a database which has combined information from the local client support activity file and the support center activity file. The support center activity file may include a record of telephone support activity, a record of electronic support activity such as email support, networked service incidents, use of internet-based support applications, and other metrics such as a technician's "time on task".

In yet another aspect of the disclosure a method for tracking support activity associated with a local computer includes the step of recording local support activity at a local computer in a local client support activity file. The method also includes the step of uploading the local client support activity file and storing it in a support center database. More specifically, the support center database and the data stored therein may be used to evaluate the effectiveness of the local support utilities as well as the support center activities.

The present disclosure provides a number of important technical advantages. One technical advantage is recording local client support activity in the local client support activity file. Recording the local client support activity provides effective and reliable measurement of the use of local support utilities.

Another technical advantage is the capability of the local client support activity file to be uploaded by a support center computer when the client contacts the support center. Uploading the local client support activity file provides an efficient method for gathering data related to local client support activity.

Another technical advantage is recording a service tag for identifying the local computer, the date and time of the local support activity, and a record of the local support activity. Recording these actions in a local activity file provides an efficient and reliable method of identifying the support steps which a particular client took prior to contacting a support center.

Another technical advantage is using the support center database to evaluate the effectiveness of local support utilities. Effective local support utilities can then be expanded while ineffective or rarely used local support utilities may be revised or eliminated.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a schematic diagram of one embodiment of a system for measuring and monitoring client support activity;

FIG. 2 is a schematic diagram of one embodiment of a system for measuring and monitoring client support activity including a networked support center computer and a telephone support center computer.

DETAILED DESCRIPTION

Figure 3:
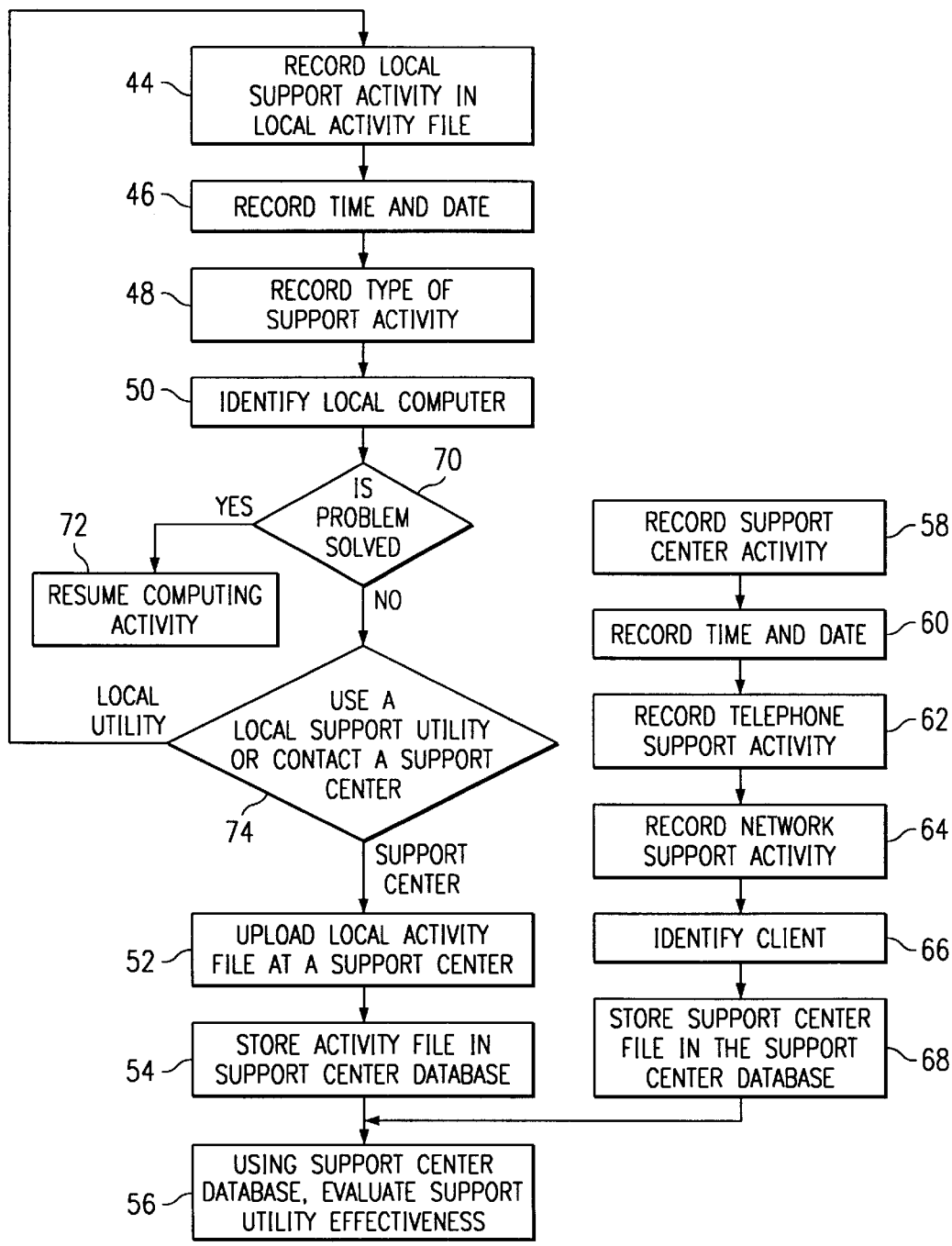
FIG. 3 is a schematic flow diagram showing a method for measuring and monitoring client support activity including recording local support activity and support center activity.

Preferred embodiments and their advantages are best understood by reference to FIGS. 1 through 3, wherein like numbers are used to indicate like and corresponding parts.

FIG. 1 is a schematic diagram of one embodiment of a system indicated generally at 10 for measuring and monitoring client support activity. System 10 includes a local computer 12 and a networked support center 16. Local computer 12 may include, for example, a personal computer, a work station, or any other device with a processor and memory suitable to be configured to facilitate measuring and monitoring client support activity. Client 14 may interface and operate 41 local computer 12. Client 14 may include an individual using a computer, a business or organization using a computer, or any other computer user. Networked support center 16 may be a support center operated by a computer manufacturer, a software maker, or any other organization or business seeking to provide, monitor, or measure support activity. Networked support center 16 may include a database 18 for storing data related to client support. Database 18 preferably includes data stored on a computer readable medium.

Local computer 12 may connect to networked support center 16 by a network 13. Network 13 may be a network such as the Internet, an intranet, Ethernet, or another suitable network of communication. Networked support center 16 preferably includes at least one server to maintain and operate the connection to network 13. Network 13 may be selectively connected such that client 14 may selectively connect local computer 12 to networked support center 16. Client 14 may connect to networked support center 16 through a connection 15. Connection 15 may be a connection such as telephone, cable, wireless connection, or another suitable connection which allows client 14 to contact a technical support representative at networked support center 16.

Networked support center 16 may include at least one utility operable to receive and process network support incidents. A network support incident may include any client support request, request for assistance, or support related communication sent through network 13. Networked support center 16 also may include at least one internet based support application that may be utilized by client 14. Internet based support applications may include frequently asked questions, support files which can be downloaded, online documents, and knowledge base documents.

In a preferred embodiment networked support center 16 includes at least one server for uploading local client support activity file 20. Support data uploaded by this server may then be preferably stored in a cumulative local activity log. Additionally, a separate server may be preferably provided for collecting data related to support center activity such as email-based support. This data may be preferably stored in a cumulative remote activity log. The cumulative local activity log and cumulative remote activity log may be stored in database 18.

Local computer 12 may include a local client support activity file 20 and a support utility 28. Local client support activity file 20 preferably connects with support utility 28 such that local client support activity file 20 may record and monitor the use of support utility 28. Local client support activity file 20 preferably includes files for recording a service tag 22 of a local computer an identification of the support activity 26 which was taken and the time and date 24. In one aspect of the present disclosure, local client support activity file 20 may be selectively disabled by client 14.

Support utility 28 further includes a help program 30, a diagnostic program 32, and a tutorial program 34. Help program 30 may include frequently asked questions and documentation related to local computer 12. Diagnostic program 32 may include an automated diagnostic program which examines particular aspects of local computer 12 for failures or inefficiencies. Diagnostic program 32 also may include flow diagrams or other tools to aid client 14 in diagnosing problems related to local computer 12. Tutorial program 34 may include programs which provide step-by-step and user-friendly instruction to familiarize client 14 with local computer 12, its components, and capabilities.

In operation, when client 14 experiences a problem with local computer 12 or has questions relating to local computer 12, client 14 may use support utility 28. Client 14 may select and use help program 30, diagnostic program 32, or tutorial program 34. After using one or more of these programs client 14 may find the answer to a particular question or solve a particular problem. In this case client 14 may proceed with desired computing activities. When client 14 uses support utility 28, a record of client's 14 activity is created and stored in local client support activity file 20. A record of the service tag 22 identifying local computer 12, time and date 24 the support activity takes place, and the support activity which takes place is made and stored in local client support activity file 20. When client 14 uses support utility 28 again, another record will be created identifying the time and date 24 and support activity 26 which takes place.

However, in the case that client 14 cannot find a solution to a problem or an answer to a question by using support utility 28, client 14 may contact networked support center 16 for assistance. Alternatively, client 14 may contact networked support center 16 without first using support utility 28. Client 14 may contact networked support center 16 either through connection 15 or network 13. If client 14 contacts networked support center 16 through connection 15, client 14 may speak directly with a technical support representative. When client 14 speaks with a technical support representative at networked support center 16, a record may be made identifying which client 14 called for assistance, the problem which the client was experiencing and the solution or answer which the customer support representative provided. This record may then be stored in database 18.

Client 14 may also contact networked support center 16 through network 13, using local computer 12. Client 14 may then utilize further support utilities available at networked support center 16 through network 13. Client 14 may also contact a technical support representative using a form of electronic communication. A record of this support activity may be at networked support center 16 and stored in database 18. The recorded activity may include a record of telephone support activity, a record of electronic support activity such as email, a record of network support incidents, use of internet based support applications, and other metrics such as a technician's "time on task".

When client 14 contacts networked support center 16 by connecting via network 13, networked support center 16 may upload local client support activity file 12. Local client support activity file 12 may then be transferred to database 18. The data stored in database 18 may be used to evaluate the use and effectiveness of support utility 28. In a preferred embodiment, data stored in database 18 including data from local client activity file 20 and records of electronic support activity and telephone support activity may be combined with technical and service data to evaluate the use and effectiveness of support utility 28.

FIG. 2, is a schematic diagram of one embodiment of a system for measuring and monitoring client support activity including a network support center computer 38 and a telephone support center computer 36. The system indicated generally at 10a includes local computer 12a, a network support center computer 38 and a telephone support center 37. Networked support center computer 38 includes a networked support center activity file operable to record support activity. Telephone support center 37 includes telephone support center computer 36 which includes a telephone support activity file 35. Client 14 may interface and operate 41 computer 12a. networked support center computer 38 and telephone support center computer 36 may be located within a single support center or may be situated in separate locations. Networked support center computer 38 may include a server or a plurality of servers which connect to local computer 12a via network 13. Networked support center computer may include a support center activity file. In this embodiment the support center activity file is a networked support center activity file 39.

Networked support center computer 38 may send and receive electronic communications to local computer 12a. Further, networked support center computer 38 may send and receive computer files such as local client support activity file 20 via network 13. Networked support center computer 38 is further connected to database 18 by connection 40 such that information received by network support computer 38 may be sent to database 18. Networked support center computer 38 and database 18 may be part of a single system such that connection 40 is a local connection. Alternatively, database 18 may be located remotely from networked support center computer 38 such that connection 40 is made over a computer network such as the Internet, an intranet, or another suitable wireline or wireless communication network. Networked support center computer 38 and telephone support center computer 36 may either operate independently or within a single system.

Client 14 may contact telephone support center 37 through connection 15. Connection 15 may comprise any connection allowing client 14 to directly contact a technical support representative at telephone support center. Telephone support center computer 36 is located within telephone support center 37 and may be a PC, a workstation, or any other system which includes a memory and a processor which a technical support representative can use to make a record of support center activity. Telephone support center computer 36 includes a support center activity file. In this embodiment, the support center activity file is a telephone support activity file 35. Telephone support activity file 35 is operable to record telephone support center activity.

Networked support center activity file 39 within networked support center computer 38 is operable to record support activity at networked support center computer 38. Networked support center activity file 39 may include a record of electronic support activity such as email support, network support incidents, use of internet-based support applications, and other metrics such as a technician's "time on task".

Local computer 12a further includes local client support activity file 20 and support utility 28. Local client support activity file 20 connects with support 30 utility 28 such that local client support activity file may record and monitor the use of support utility 28. Local client support activity file 20 is operable to be uploaded by networked support center computer 38. Local client support activity file 20 further includes files for recording service tag 22, a support activity identification 25, a reference identification 27, and time and date 24. Support activity identification 25 may include an identification of a particular application or program within support utility 28, such as help type program 30, diagnostic type program 32, and tutorial type program 34. Reference identification 27 may include an identification of the steps taken within a particular application. For example, if client 14 explores files of frequently asked questions within help program 30, a record of which files of frequently asked question were opened may be recorded in reference identification 27.

In operation, when client 14 experiences a problem with local computer 12 or has questions relating to local computer 12, client 14 may use support utility 28. Client 14 may select and use help program 30, diagnostic program 32, or tutorial program 34. After using one or more of these programs client 14 may find the answer to a particular question or solve a particular problem. If client 14 is satisfied the a particular problem solved, client 14 may resume computing activity. When client 14 uses support utility 28, a record of client's activities are preferably created and stored in local client support activity file 20. For example, a record of the service tag 22 identifying local computer 12, time and date 24 the support activity takes place, support activity identification 25, and reference identification 27 is made and stored in local client support activity file 20. When client 14 uses support utility 28 again, another record will be created identifying the time and date 24 and support activity 26 which takes place.

However, if client 14 cannot find a solution to a problem or an answer to a question by using support utility 28 after using a particular support utility, client 14 may either use another local support utility or contact a support center 74. Client 14 may contact either networked support center computer 38 or telephone support center 37 for assistance. Client 14 may connect local computer 12 with networked support center computer 38 through network 13 or client 14 may contact telephone support center 37.

When client 14 contacts networked support center computer 38, client 14 may download support utilities, send requests for assistance to networked support center computer 38, use support applications, or engage in other network support activities. A record of the support activity may be recorded in the support center activity file such as networked support center activity file 39.

When client 14 connects to networked support center computer 38, local client support activity file 20 may be uploaded by networked support center computer 38. The data contained within local client support activity file 20 and the support center activity file may then be transferred and stored in database 18.

When client 14 contacts telephone support center 37, a technical service representative may record the support center activity in the telephone support center computer 36. This record may then be stored in database 18. Data stored within database 18 may further be arranged such that local support activity is stored in a local client support activity file and support center activity is stored in a support center activity file. The support center activity file may comprise records from networked support center activity file 39 and telephone support activity file 35. The data stored in database 18 may be used to evaluate the use and effectiveness of the complete service experience.

FIG. 3 is a schematic flow diagram showing a method for measuring and monitoring client support activity including recording local support activity and support center activity. The method includes the step of recording local support activity in a local client support activity file 44 when client 14 uses the support utility 28 of a local computer. Recording local support activity 44 includes recording the time and date 46, recording the type of support activity 48, and identifying the local computer 50.

After using support utility 28, if a question is answered or the problem is solved 70, computing activity 72 may resume. However, in the event that a problem is not solved, another local support utility may be used or a support center may be contacted 74. If another local support utility is used, the method returns to the step of recording local support activity in local activity file 44. Alternatively, if a support center is contacted, the local client support activity file 20 may then be uploaded at a support center 52 and stored in the support center database 54.

Independent from the above steps, support center activity may be recorded 58 including recording the time and date 60, recording the telephone support activity 62, and recording the network support activity 64. Additionally, recording the support center activity may include recording the identity of the client 66. The record of support center activity may then be stored in the support center database 68. The support center database, including data from local client support activity as well as networked support center activity and telephone support activity data, may then be used to evaluate the effectiveness of support center utilities 56.

Although the disclosed embodiments have been described in detail, it should be understood that various changes, substitutions and alterations can be made to the embodiments without departing from their spirit and scope.

What is claimed is:

1. A computer system for measuring and monitoring local client support activity associated with providing service and support to a client using a local computer comprising:
   the local computer having a local client support activity file, the local client support activity file operable to record local client support activity, the local computer operable to selectively connect with a networked support center;
   the local client support activity file further operable to be uploaded over a network when the client contacts the networked support center using the local computer; and
   the networked support center having at least one support utility operable to provide client support and operable to receive and store the local client support activity file;
   the support utility selected from the group consisting of a help type program, a tutorial type program, and a diagnostic type program comprising a resource for examining a local computer for failures; and
   the local client support activity file further comprising:
   a service tag for identifying the local computer;
   a record of the date and time of the local support activity; and
   a record of local support activity.

2. The computer system of claim 1 wherein the local computer comprises:
   the at least one support utility, the support utility further comprising at least one local client support utility; and
   the local client support activity file further operable to record local client support utility activity.

3. The computer system of claim 1 further comprising:
   a networked support center computer selectively connected to the local computer; and
   the networked support center computer operable to upload the local client support activity file.

4. The computer system of claim 3 further comprising:
   the networked support center computer operable to provide the at least one support utility, the support utility further comprising at least one support center utility; and
   a support center activity file maintained at the support center computer operable to record support center activity.

5. The computer system of claim 4 wherein the at least one support center utility comprises:
   at least one internet based support application; and
   the support center activity file further operable to record internet based support application activity.

6. The computer system of claim 4 wherein the at least one support center utility comprises:
   at least one utility operable to receive and process a network support incident; and
   the support center activity file further operable to record the network support incident.

7. The computer system of claim 4 further comprising:
   a telephone support portion; and
   the support center activity file further operable to record telephone support activity.

8. The computer system of claim 4 wherein the networked support center computer further comprises a database for collecting uploaded client support activity files.

9. A computer system for measuring and monitoring client service and support activity associated with a local computer comprising:
- a local client support activity file maintained at the local computer;
- a support center activity file maintained at a networked support center;
- a database selectively connected with the local computer and the networked support center having combined information from the local client support activity file and the support center activity file;
- the networked support center providing at least one support utility selected from the group consisting of a help type program, a tutorial type program, a diagnostic type program comprising a resource for examining a local computer for failures; and
- the local client support activity file further comprising:
- a service tag for identifying the local computer;
- a record of the date and time of the local support activity; and
- a record of local support activity.

10. The computer system of claim 9 further comprising:
- the local client support activity file operable to monitor and record use of selected portions of the at least one support utility at the local computer;
- the local client support activity file further operable to be uploaded by a support center computer selectively connected to the local computer; and
- the support center computer further connected to the database such that data from the local client support activity file may be transferred into the database.

11. The computer system of claim 10 wherein the support center activity file further comprises:
- an electronic support based portion; and
- a telephone support based portion.

12. The computer system of claim 11 wherein the electronic support based portion comprises a record of networked service incidents.

13. The computer system of claim 11 wherein the electronic support based portion comprises a record of internet based support activity.

14. The computer system of claim 11 wherein the telephone support based portion comprises a record of telephone support activity.

15. A method for tracking support activity associated with a local computer comprising the steps of:
- recording local support activity at the local computer in a local client support activity file, the local client support activity file further comprising:
- a service tag for identifying the local computer;
- a record of the date and time of the local support activity; and
- a record of local support activity;
- uploading the local client support activity file at a networked support center computer including providing at least one support utility selected from the group consisting of a help type program, a tutorial type program, and a diagnostic type program wherein the diagnostic type program comprises a resource for examining a local computer to identify inefficiencies; and
- storing the local client support activity file in a support center database.

16. The method of claim 15 further comprising using the support
center database and the data stored therein to evaluate the effectiveness of the at least one
support utility, wherein the at least one support utility further comprising at least one local support utility.

17. The method of claim 15 further comprising:
- recording networked support center activity in a support center activity file; and
- storing the support center activity file in the support center database.

18. The method of claim 17 further comprising using the support center database to evaluate the use and effectiveness of the at least one support utility, wherein the at least one support utility further comprises at least one local support utility and at least one support center utility.

19. The method of claim 18 wherein recording support center activity further comprises recording internet based support activity.

* * * * *